June 24, 1947. W. T. SCHELLING ET AL 2,422,802
DEHYDRATION OF DIACETONE GLYCOL TO FORM A METHYL PENTADIENE
Filed Jan. 3, 1944 2 Sheets-Sheet 1
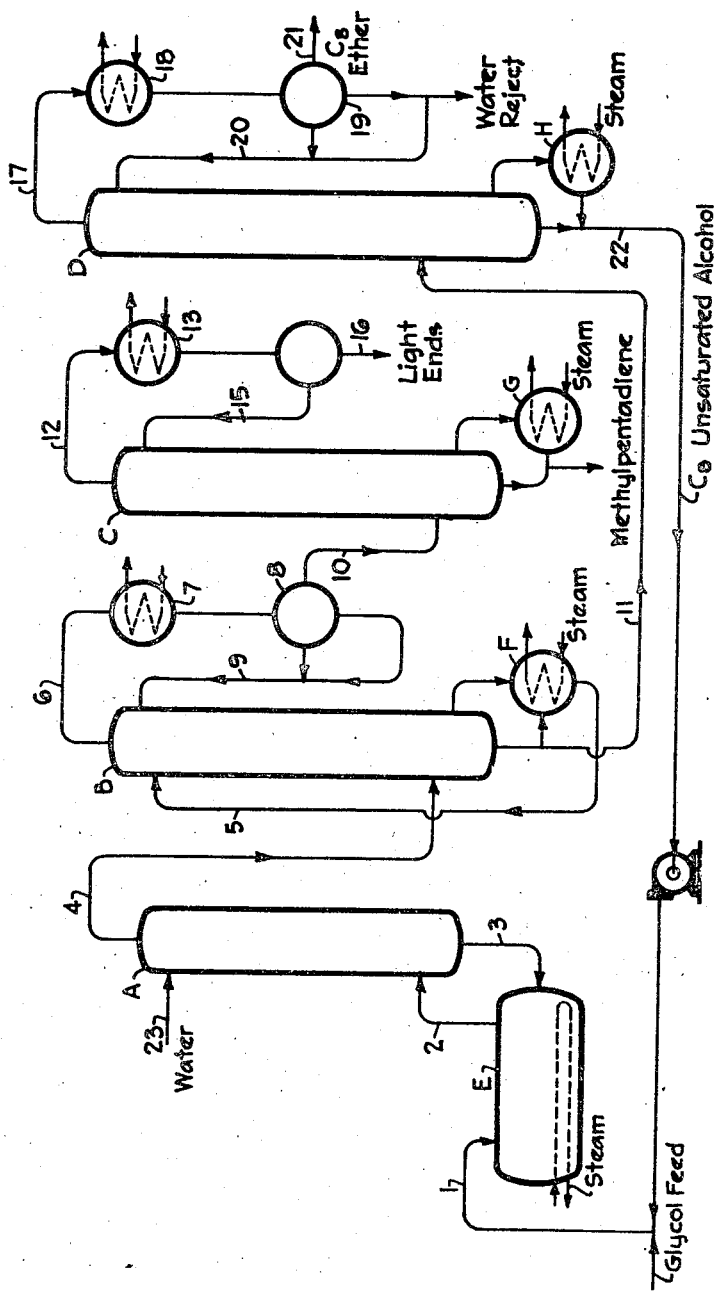
FIG. I
Inventors: William T. Schelling
John Anderson
By Their Attorney:

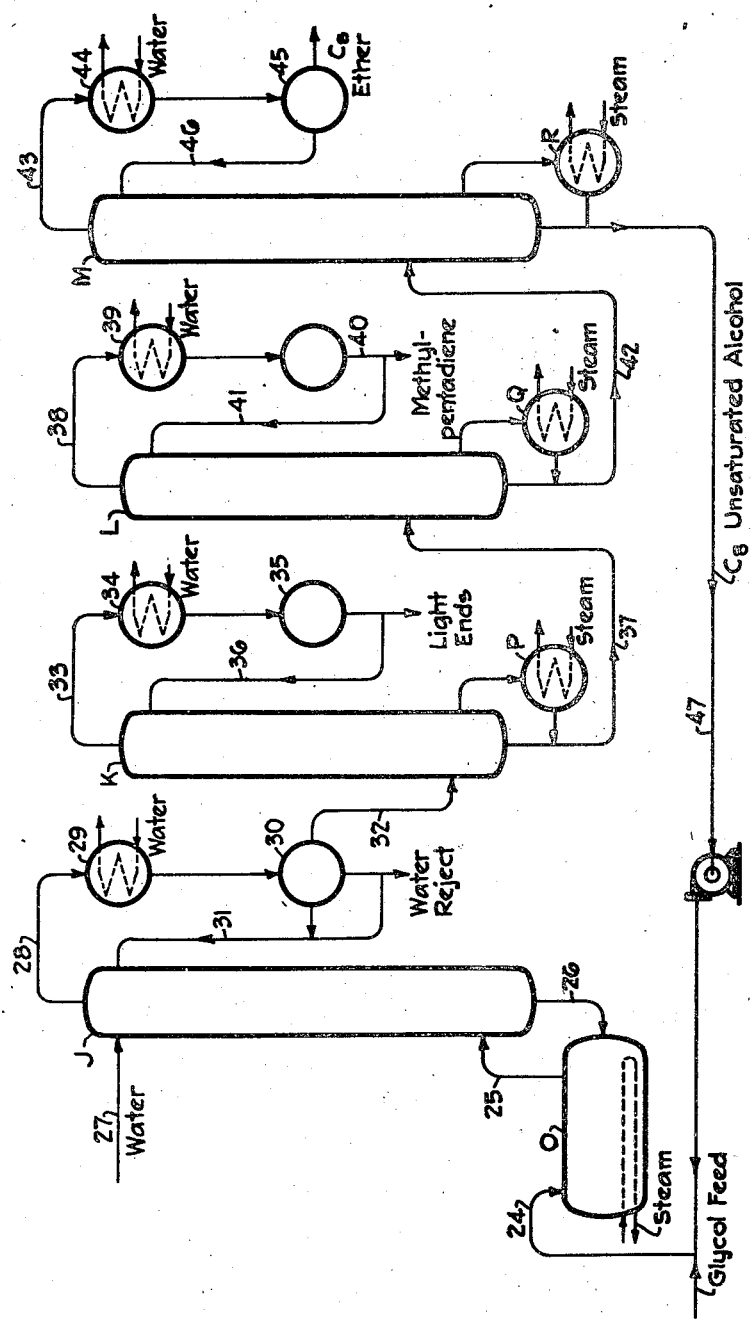
FIG. II

Patented June 24, 1947

2,422,802

UNITED STATES PATENT OFFICE 2,422,802

DEHYDRATION OF DIACETONE GLYCOL TO FORM A METHYL PENTADIENE

William T. Schelling, Oakland, and John Anderson, Berkeley, Calif., assignors to Shell Development Company, San Francisco, Calif., a corporation of Delaware Application January 3, 1944, Serial No. 516,882

6 Claims. (Cl. 260—681)

This invention relates to the production of polyolefinic hydrocarbons by dehydration of polyhydric alcohols, and to the manufacture of new and useful ether products. The process is particularly adapted to the production of diolefins from dihydric alcohols containing at least four carbon atoms and having non-vicinal carbinol groups, by dehydrating the glycol in the presence of a dehydration catalyst to yield the diene plus water and by-products including light ends, unsaturated alcohol intermediates and ether by-products. The process of this invention provides an improved distillation procedure particularly adapted to a continuous mode of operation, whereby the diene is recovered, light ends, water and the ether by-products are removed, and the unsaturated alcohol intermediates are recovered and recycled for further dehydration to diene.

The new ether products which are recovered may serve a variety of useful purposes as solvents, auxiliary agents for industrial use, intermediates in organic syntheses, etc.

Heretofore, the dehydration of dihydric alcohols to diolefins has been carried out in a reaction system wherein the glycol was heated in the presence of a dehydration catalyst, the diene along with the light ends and some water were distilled over, and the diene fractionated out in a finishing column. The unsaturated alcohol intermediate as well as the ether by-product formed in the dehydration were refluxed back to the kettle. In the case of the dehydration of diacetone glycol to methyl pentadiene, the deleterious effect of returning the ether by-product as well as the unsaturated alcohol is shown by the low production rate and the short operating cycle, and may be due to reaction of the ether or an impurity therein upon the catalyst, to poison the catalyst and also reduce its activity by decreasing its effective concentration in the reaction mixture. This causes a low reaction rate and necessitates halting the reaction at frequent intervals to remove the inactivated catalyst and to add fresh catalyst to maintain the desired concentration. Even aside from any specific effect on the catalyst, the presence of large amounts of high boiling by-product accumulated in the reaction chamber will reduce the effective concentration of the reactants, thereby reducing the reaction rate and the length of the operating cycle.

An object of this invention is to produce diolefins from dihydric alcohols more efficiently and economically in higher yield. In accordance with this object, a method is provided for rapid removal of the ether by-products from the dehydration zone, with subsequent separation and purification of the diene, removal of water, light ends and ether by-products, and recovery and recycle of unsaturated alcohol intermediates to the dehydration zone. In addition, water may be introduced into the fractionation zone which is in direct communication with the dehydration zone, by means of return of water of dehydration or by addition of fresh water. In one of the preferred embodiments of the invention, a glycol, such as diacetone glycol, is heated in the presence of a dehydration catalyst, water is introduced into the top of the fractionation zone which is in direct communication with the dehydration zone, by reflux of water of dehydration or by addition of fresh water; the overhead distillate from the first fractionation zone comprising diene, unsaturated alcohol intermediates, ether by-products, light ends and water, is treated in a second fractionation zone to remove as an overhead distillate the desired diene and light ends, which are then passed over to a finishing fractionation column wherein the diene is easily separated from the light ends. The bottoms from the second fractionation zone, containing water and both the unsaturated alcohol intermediates and the ether by-products, are then treated to remove water and ether by-products. The intermediate unsaturated alcohol is recovered and recycled to the dehydration zone. Depending upon the specific ether by-products produced in any specific case, it may be advantageous to remove them by forming an azeotrope rich in ether by-product. If necessary, an agent may be added to help form the azeotrope. In some cases, the water which has been carried over from the dehydration zone may form a ternary azeotrope with the ether by-product and the unsaturated alcohol intermediate; for example, when diacetone glycol is dehydrated to methyl pentadiene, the $C_8$ ether by-product and the $C_6$ unsaturated alcohol intermediate form an ether-rich ternary azeotrope with the water present from the dehydration, and no added agent is necessary.

In order that this invention may be more clearly understood, it will be described with particular reference to the production of substantially pure hexadiene by the dehydration of diacetone glycol, prepared by hydrogenation of the diacetone alcohol formed by the inter-reaction of acetone, in the presence of a dehydration catalyst such as iodine and hydrogen chloride. But, it is to be understood that the process of the invention is not to be limited to this specific application, for it can be used as advantageously in the dehydration of other polyhydroxy alcohols, particularly glycols containing four or more carbon atoms such as, for example, those glycols formed by the hydrogenation of the hydroxylated carbonyl compounds resulting from the inter-reaction of such carbonylic compounds as methyl ethyl ketone, methyl n-propyl ketone, methyl isopropyl ketone, diethyl ketone, ethyl n-propyl ketone, methyl isobutyl ketone, etc., the aliphatic aldehydes such as acetaldehyde, propionaldehyde, the butyraldehydes, etc.

The inter-reaction of the aldehyde or ketone according to the first step of the process may be conducted, for example, for the production of a simple hydroxy ketone or aldol corresponding to the union of only two molecules of the reacting compound or compounds, or may be conducted for the production of a higher condensation product. The determining factor as to the extent of the reaction is, of course, the polyolefinic compound, ultimate production of which is desired. Most preferably, the carbonylic material is so selected that the hydroxylated carbonyl compound produced by its inter-reaction is of such a character that when hydrogenated according to the second step of the process the polyhydroxy compound formed does not contain a primary hydroxyl group or a hydroxyl group attached to a secondary carbon atom, which is adjacent to another secondary carbon atom to which a hydroxyl group is attached, or to a tertiary carbon atom having a hydroxyl group attached thereto. Inter-reaction of the selected carbonylic material to form the desired hydroxylated carbonyl compound may be effected in any suitable manner, for example, under the influence of alkalies as alkali bicarbonates, alkali carbonates, alkali acetates, alkali cyanides, sodium hydroxide, and alcoholates. It will be understood that the exact procedure followed, including the choice of catalyst, is dependent upon the nature of the carbonylic material being worked. In large scale operation the improved procedure for carrying out aldol condensation reactions described in U. S. Patent 2,130,592 is advantageous where applicable. The method of this patent comprises passing the carbonylic material upwardly through a cooled bed of a granular condensation catalyst comprising a suitable basic substance, such as soda-lime or calcium oxide, capable of promoting the desired condensation and a suitable binder for the particles thereof.

After formation of the desired hydroxylated carbonyl compound by any suitable method, separation thereof from the unreacted carbonylic material and other products of the reaction, if any, such as products of a higher and/or lower degree of condensation, may be effected in most cases by simple distillation under reduced pressure. The hydroxylated carbonyl compound need not be of highest purity for the purpose of its subsequent hydrogenation.

While the hydrogenation constituting the second step of the present process may be conducted with the hydroxylated carbonyl compound in the vapor phase, liquid phase operation is preferred, particularly when working with keto-alcohols produced by inter-reacting acetone with other ketones containing four or more carbon atoms, as such keto-alcohols are relatively easily decomposed at temperatures sufficiently high to cause vaporization thereof. The liquid phase hydrogenation of the hydroxylated carbonyl compound is preferably carried out at a low temperature in the presence of a suitable hydrogenation catalyst. By a low temperature is meant a temperature substantially below the atmospheric boiling point of the hydroxylated carbonyl compound. For example, in the hydrogenation of diacetone alcohol, which boils at approximately 165° C., to diacetone glycol (2-methyl pentane-2,4-diol), a temperature of between about 50° C. and about 125° C. is preferable. Hydrogen pressures of any practical magnitude may be employed. Most suitably, reaction time is controlled by varying the hydrogen pressure and/or by decreasing or increasing the amount of catalyst rather than by varying the temperature.

In the execution of the hydrogenation step of the present process, it has been found that particularly good results follow from the use of a pyrophoric nickel catalyst such as Raney nickel. However, good results can also be obtained by using relatively inexpensive and readily regenerated base metal catalysts which possess the desired degree of activity. For example, the metals as iron, cobalt, copper, chromium and thallium are particularly active and efficacious catalysts when employed in a finely divided state or deposited on a suitable carrier. The oxides of the metals, particularly the oxides of nickel, cerium, thorium, copper, chromium and zirconium or mixtures comprising two or more metal oxides or one or more metal oxides with one or more metals, have been found useful as catalysts and components of catalyst mixtures. In some cases, compound catalysts comprising two or more metals in admixture or alloyed as, for example, silver-copper, copper-chromium, copper-zinc, nickel-cobalt, nickel-zinc, etc., are valuable catalysts. Although the base metal catalysts are generally preferred, catalysts of the desired activity may also be selected from the group consisting of the noble metals as silver, gold, platinum, palladium, osmium, ruthenium, rhodium and iridium.

The hydrogenation catalysts may be prepared by any suitable method and employed severally or in combination or in admixture. The metal catalysts are preferably employed in a finely divided state. Any suitable hydrogenation catalyst may be incorporated with or deposited on a relatively inert substance or carrier as pumice, charcoal, alumina, silica gel, kieselguhr and the like. In many cases, the activity of a selected catalyst may be considerably enhanced by incorporating therewith small quantities of other substances capable of acting as promoters. A class of suitable promoters includes the high melting and difficultly reducible oxygen-containing compounds, in particular the oxides and oxygen-containing salts of elements as the alkaline earth and rare earth metals, beryllium, magnesium, aluminum, copper, thorium, manganese, uranium, vanadium, columbium, tantalum, chromium, boron, zinc and titanium. A particularly suitable group of promoters includes the difficultly soluble phosphates, molybdates, tungstates and selenates of the above-listed metals, or the oxygen-containing reduction products of such compounds as, for example, the selenites.

In using Raney nickel as the hydrogenation catalyst, the catalyst is preferably maintained in a dispersed state throughout the body of the liquid reaction mixture, by means agitating the reactor itself or by stirring means within the reactor.

If it is desired to conduct the hydrogenation under dilution, any solvent may be used which is stable under the relatively mild conditions of the hydrogenation and not a catalyst poison. The boiling point of the solvent should be such as to render it easily separable upon completion of the hydrogenation or at a later stage. Where the preferred pyrophoric nickel metal catalysts are employed, suitable solvents include: alcohols such as ethanol, isopropanol, butanol, and the like; ethers such as diethyl ether, di-isopropyl ether, glycols, for example ethylene glycol, diethylene glycol, propylene glycol, butylene glycol, and other 1,2-glycols, glycerol, the methyl glycerols, etc.

Separation of the polyhydroxy product from the reaction mixture resulting from the hydrogenation of the hydroxylated carbonyl compound is accomplished, subsequent to the removal of any hydrogenation catalyst which may be present as by decantation, centrifugation, filtration, etc., by any appropriate method such as simple fractionation, solvent extraction, adsorption, extractive distillation and chemical means. The exact procedure followed in any individual case is naturally dependent upon the nature and respective amounts of the components of the reaction mixture, the relation of their boiling points to the boiling point of the polyhydroxyl compound to be separated, etc.

The dehydration of the glycol is carried out preferably in the presence of a catalyst which is reactive at a temperature below the boiling point of the glycol. However, in certain cases higher temperatures may be used if reaction in the vapor phase is desirable. Such a catalyst may be a mono-sodium acid phosphate, or a halogen acid, particularly hydrogen iodide, hydrogen chloride or hydrogen bromide. When the reaction is carried out at a low temperature in a non-pyrogenetic manner, iodine has been found to be convenient and to produce superior results. Substantially any practical amount of iodine may be used, but, in general, it is preferred to operate with an amount between about 0.02 gram and 0.5 gram of iodine per mol of glycol in the feed. Excellent results have been obtained by using a glycol feed containing between about 0.03 and 0.09 weight per cent of iodine. In the dehydration of diacetone glycol to methyl pentadiene, an increase in the concentration of iodine in the feed from 0.03 to 0.07 weight per cent at a dehydration temperature of about 130° C. yielded an increase in the diene production rate from 0.5 to about 2.5 volumes per volume of kettle charge per hour, and an apparent increase in the length of the operating cycle from about 20 to over 150 volumes of diene per volume of kettle charge. Results using 0.05 weight per cent iodine are good, but 0.07 weight per cent is apparently more advantageous.

The hydrogenation of the hydroxylated carbonyl compound would produce a dihydroxy alcohol, and the diene or unsaturated alcohol formed by dehydration of this glycol may react with the aldehyde produced by the dehydration cleavage of the glycol, to form a cyclic ether which is, at the present, believed to have the general formula

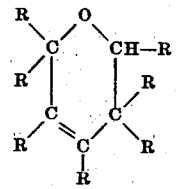

wherein the R's may be the same or different and represent substituents selected from the group consisting of the hydrogen atom and the alkyl, aryl, alkaryl and aralkyl radicals such as, for example, methyl, ethyl, propyl, isopropyl, phenyl, benzyl, phenyl-ethyl, methyl-benzyl, etc. When this ether is formed as a by-product and has a boiling point in the neighborhood of that of the unsaturated alcohol intermediate, the ether may be removed by formation of an azeotrope (lower boiling than the alcohol intermediate) with the unsaturated alcohol intermediate, or water, or added agent, or with any combination of these three substances. When an added agent is required, it must of necessity be otherwise inert to the reactants and products under the conditions of the reaction.

In the case of the dehydration of diacetone glycol (2-methyl-pentane-2,4-diol) to 2-methyl pentadiene, the by-product is a $C_8$ ether which apparently has the following structure

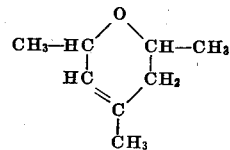

and may be considered to result from the reaction of methyl pentadiene or $C_6$ unsaturated alcohol with acetaldehyde, which is contained in the light ends and is formed by cleavage of the glycol.

It has been discovered that this $C_8$ ether by-product forms with water and the $C_6$ unsaturated alcohol intermediate in the dehydration of diacetone glycol, a ternary azeotrope with an upper layer of the approximate composition.

| | Per cent by weight |
|---|---|
| $C_8$ ether | 86.43 |
| $C_6$ unsaturated alcohol | 12.5 |
| Water | 1.07 | and boiling at 90.7° C. This upper layer constitutes 73.3 weight per cent at 25° C., while the remaining 26.7 weight per cent of lower layer has the approximate composition

| | Per cent by weight |
|---|---|
| $C_6$ unsaturated alcohol | 1.88 |
| Water | 98.12 | so that the total azeotrope has the approximate composition

| | Per cent by weight |
|---|---|
| $C_8$ ether | 63.3 |
| $C_6$ unsaturated alcohol | 9.7 |
| Water | 27.0 |

The $C_6$ unsaturated alcohol-water azeotrope with a boiling point of 94.6° C. is made up of 64.5 weight per cent of upper layer at 25° C. with the approximate composition

| | Per cent by weight |
|---|---|
| $C_6$ unsaturated alcohol | 89.0 |
| Water | 11.0 | and the remaining 35.5 weight per cent comprising lower layer of the approximate composition

| | Per cent by weight |
|---|---|
| $C_6$ unsaturated alcohol | 5.0 |
| Water | 95.0 | so that the total azeotrope has the approximate composition

| | Per cent by weight |
|---|---|
| $C_6$ unsaturated alcohol | 59.2 |
| Water | 40.8 |

In its application to the production of methyl pentadiene from diacetone glycol, the process of the invention essentially comprises subjecting the diacetone glycol and iodine to heat in a dehydration kettle provided with a fractionation column to prevent unreacted glycol from going overhead, and introducing water into the top of this column by reflux of water of dehydration or by addition of fresh water. The products which are distilled over consist essentially of methyl pentadiene, light ends such as isobutylene, acetaldehyde, etc., $C_6$ unsaturated alcohol intermediate and $C_8$ ether by-product. Water and some hydrogen iodide are also carried along in this distillate.

The distillate is then fractionated in a second fractionation column to separate light ends and the methyl pentadiene-water azeotrope (boiling point, 67° C.) of the following approximate composition

| | Per cent by weight |
|---|---|
| Methyl pentadiene | 92.5 |
| Water | 7.5 | from the mixture of ether, unsaturated alcohols and water (boiling point, 90° C. to 95° C.). In this step the hydrogen iodide is stripped by adding sodium carbonate or other non-volatile alkali solution to the kettle of the second column or by introducing it into the second column. The top fraction from the second column, which fraction contains methyl pentadiene and light ends, is subjected to further fractionation in a finishing fractionation column to separate methyl pentadiene from the light ends. The mixture of methyl pentadienes formed by dehydration of diacetone glycol appears to contain two isomeric conjugated methyl pentadienes, 2-methyl-1,3-pentadiene and 4-methyl-1,3-pentadiene, predominantly the former.

The bottoms from the second fractionation column, which contain ether by-products, unsaturated alcohol and water, are passed to a fourth fractionation column wherein the water of dehydration is taken overhead as is a ternary azeotrope consisting of an ether-rich mixture of ether, unsaturated alcohol and water of the following approximate composition

| | Per cent by weight |
|---|---|
| $C_8$ ether | 63.3 |
| $C_6$ unsaturated alcohol | 9.7 |
| Water | 27.0 |

This ternary azeotrope distils off at 90.7° C. and leaves as bottoms the $C_6$ unsaturated alcohol intermediate which is recycled to the dehydration kettle. The alcohol-water azeotrope has a boiling point of 94.6° C. and has the approximate composition

| | Per cent by weight |
|---|---|
| $C_6$ unsaturated alcohol | 59.2 |
| Water | 40.8 |

In the fourth column the water reflux is controlled to maintain water in the column, while substantially anhydrous conditions prevail in the kettle. (A deficiency of water is quickly shown by a temperature above about 95° C. near the bottom of the column, while an excess is indicated by a temperature below about 130° C. in the kettle.) In order to prevent any of the alkaline stripping solution from being taken over from the kettle of the second fractionation column with the ether by-product, unsaturated alcohol and water mixture to the fourth column, and thence recovered and recycled with the $C_6$ unsaturated alcohol to the dehydration kettle where the iodine catalyst would be reacted upon by the alkali and destroyed, the organic materials are separated from the sodium carbonate or alkali by evaporation before the said organic materials are conducted to the fourth fractionation column. The alkali solution is recycled from the kettle of the second fractionation column to the top of the second column.

It has been found most advantageous to operate the first column with sufficient water reflux or with introduction of sufficient fresh water to maintain the head temperature at a conveniently low level. In the dehydration of diacetone glycol, the head temperature is held to about 90° C. to 95° C. This water reflux in the primary column is of greater importance than the temperature change involved would indicate. The presence of water in some runs resulted in a higher production rate than other runs which used higher temperatures and a greater catalyst concentration. Apparently this water reflux produces a higher equilibrium catalyst concentration and, consequently, a higher diene production rate. The presence of water minimizes the loss of volatile water-soluble catalyst, thereby producing a higher equilibrium catalyst concentration which results in a higher production rate. It also minimizes the carryover of higher boiling compounds without interfering with the rapid removal of the ether by-product. When water reflux was not used in the dehydration of diacetone glycol, as much as 15 per cent of high boiling material (principally a $C_{12}$ ether) was found in the alcohol recycle stream. However, this ether dehydrated to form the hexadienes without difficulty in a batch experiment.

The dehydration of the glycol is carried out at a temperature sufficient to bring about dehydration and to produce products in distillate form, and yet not so high that loss of excessive amounts of catalyst occurs, or that charring of the reactants and/or products takes place. In most cases the temperature is preferably below the boiling point of the glycol. The suitable temperature chosen in any case of necessity depends upon the specific glycol being reacted and upon the nature of the catalyst. In general, temperatures in the range of between about 100° C. and about 200° C. are suitable. The temperature in the still head of column I is preferably maintained about 25° to about 75° lower than that in the dehydration kettle to help prevent catalyst loss by vaporization and to repress side reactions wherein undesirable products may be formed. When diacetone glycol is the glycol to be dehydrated, the dehydration kettle is heated to about 120° C. to about 140° C., while the still head temperature is preferably held at 90° C. to 95° C.

The temperature in the kettle of the second fractionation column, where two liquid phases are maintained (the small aqueous phase containing alkali and neutralized catalyst, and the larger organic phase), is just below 100° C. to allow the maintenance of the separate aqueous phase; yet it must be sufficient to vaporize the organic products. The temperature of the bottom of the second column is the same as, or a few degrees lower than, the kettle temperature, while the top of the column is held down to a narrow range including that temperature at which the diene-water azeotrope distills over, while the bulk of the water, the unsaturated alcohol intermediate and ether by-product is retained at the bottom of the column and in the kettle. The temperature in the kettle of the second column, when the process is applied to the dehydration of diacetone glycol, is about 93° C. to 95° C., the temperature at the bottom of the second column is about 90° C. to about 95° C., and the temperature at the top of the second column is about 65° C. to 70° C. (the boiling point of the methyl pentadiene-water azeotrope is 67.0° C.).

The kettle of the fourth fractionation column is maintained at a temperature equal to about that of the boiling temperature of the anhydrous unsaturated alcohol intermediate, the temperature of the bottom of the fourth column is kept about equal to that of the boiling point of the alcohol-water azeotrope, while the temperature of the top of the fourth column is held down to a narrow range including the boiling point of the ether-rich azeotrope. In the case of diacetone glycol, the temperature in the kettle of the fourth column is kept at about 120° C. to 130° C. (the boiling point of the $C_6$ unsaturated alcohol is 130° C.), the temperature at the bottom of the fourth column at 95° C. (the boiling point of $C_6$ unsaturated alcohol-water azeotrope is 94.6° C.), and the temperature at the top of the fourth column is maintained at 90° C. to 92° C. (the boiling point of the ternary azeotrope is 90.7° C.).

When iodine or hydrogen chloride are used as dehydration catalysts in this reaction, the hydrogen iodide formed or the hydrogen chloride, as well as their respective unstable halide compounds, are carried over with the distillate from the first column and must be removed before they reach the fourth column, for they will cause further dehydration of the unsaturated alcohol intermediate to diene which will be lost to recovery and also will interfere with the azeotrope separation. Therefore, dilute sodium carbonate or other non-volatile alkali solution is added to the kettle of the second column or introduced into the second column to neutralize and/or hydrolyze the hydrogen halide and/or unstable halide compounds carried over. The alkaline solution must be of sufficient strength and in amounts sufficient to assure that substantially all of the halide is neutralized and/or hydrolyzed.

The sizes of the columns would of necessity depend upon the specific reaction in any case and upon the amount of product desired. The number of theoretical plates to be employed in any column would depend upon the nature of separation reaction taking place therein. When diacetone glycol is dehydrated to methyl pentadiene, it has been found convenient to have the fractionation column, which is in direct communication with the dehydration kettle, of a relatively small size of about 3 to 5 theoretical plates. The second fractionation column may contain about 5 to 15 theoretical plates, and it has been found convenient to use about 10. The finishing fractionation column wherein methyl pentadiene is separated from light ends also contains about 5 to 15, conveniently about 10, theoretical plates; while the fourth fractionation column is the largest and contains about 20 to 30 theoretical plates.

To more clearly understand how the process of the invention may be applied to the production of polyolefinic hydrocarbons from polyhydric alcohols reference may be made to the attached Figure I showing a preferred assemblage of apparatus adapted for use in the production of methylpentadiene from diacetone glycol. It is to be understood, however, that the drawing is intended only as an illustration and should not be considered as limiting the invention in any way.

The apparatus shown in Figure I consists essentially of a dehydration chamber designated as E, and four fractionating columns A, B, C and D with columns B, C and D possessing attached steam kettles and water condensers. Column A is the smallest of the four fractionating columns and contains from 3 to 5 theoretical plates. Columns B and C are the same size, slightly larger than column A and contain from 5 to 15 theoretical plates. Column D is the largest of the other three and contains from 20 to 30 theoretical plates.

The particular reaction conditions to be maintained in the dehydration chamber and the specific kettle and stillhead temperatures to be used in the various fractionations in the operation of the apparatus are similar to those described hereinabove for use in the production of the methylpentadiene from diacetone glycol by the general process of the invention.

In the operation of the apparatus the diacetone glycol or the $C_6$ unsaturated alcohol obtained from a previous operation of the process is introduced into the dehydration chamber E through conduit 1. The products of the dehydration reaction are conducted to the first distillation column A through conduit 2. Water is introduced into the top of the column A through pipe 23. Unreacted diacetone glycol is returned to the dehydration chamber through conduit 3. The distillate from the first fractionation which consists essentially of methylpentadiene, light ends such as isobutylene, acetaldehyde, etc., $C_6$ unsaturated alcohol intermediate and $C_8$ ether by-products is conducted into the second fractionating column B through conduit 4. Kettle F of fractionating column B contains sodium bicarbonate or other alkali to remove the hydrogen iodide carried over with the distillate and the sodium carbonate solution is circulated to the top of the column through conduit 5. The top fraction of column B which consists of methylpentadiene and the light ends is conducted through conduit 6 to condenser 7 and the resulting liquid separated into an aqueous and organic phase in accumulator 8. The aqueous phase and some of the organic phase is returned to column B through conduit 9. The major fraction of the organic phase collected in 8 is conducted to the third fractionating column C through conduit 10. The light ends such as isobutylene, acetaldehyde, etc., are removed in fractionating column C through conduit 12, condensed by condenser 13, and collected in accumulator 16 as a by-product of the process. The methylpentadiene is recovered as bottoms of the fractionation in column C. The bottoms of column B are conducted through conduit 11 to a fourth fractionation column D. In this tower the $C_8$ ether is taken off overhead, condensed by condenser 18 and the resulting liquid separated into an aqueous and organic phase in accumulator 19. The aqueous phase and some of the organic phase collected in 19 are conducted back to the column D through conduit 20. The major portion of the organic phase consisting of the $C_8$ is removed through conduit 21 as a product of the process. The bottoms of the fractionation in column D consist of the $C_6$ unsaturated alcohol intermediate which is recycled back to the initial dehydration reaction through conduit 22.

Another embodiment of the invention essentially comprises heating a glycol, such as diacetone glycol, in the presence of a dehydration catalyst, introducing water to the top of the fractionation column which is in direct communication with the dehydration zone to provide the desired amount of water in proportion to the amount of organic materials in the column, treating the crude distillate to form two phases—an upper organic layer and a lower aqueous layer, rejecting the aqueous layer or recycling a portion of it to the top of the fractionation column, returning a portion of the organic layer as reflux to the dehydration zone, treating the remainder of the organic distillate layer to remove the light ends, then further treating to recover the diene. The remaining mixture of ether and unsaturated alcohol intermediate is treated to separate the unsaturated alcohol and recycle it to the dehydration zone. In this first kettle and column, the dehydration takes place and most of the water of dehydration is removed from the organic products containing the diene, light ends, unsaturated alcohol intermediate and ether by-product. However, this first column must not be allowed to become dehydrated, or, as in the process heretofore used, the operating cycle will be short and the production rate will be low, due, to some extent perhaps, to the high concentration of ether in the dehydration zone because of the lack of sufficient water for forming the ether-rich, alcohol-water-ether ternary azeotrope which is, in the case of the ether formed by dehydration of diacetone glycol, the lowest boiling ether-containing mixture. The accumulation of ether will decrease the effective concentration of the reactants and cause the formation of high boiling material which may consume the iodine catalyst, thus decreasing the efficiency of the reaction. Therefore, along with the reflux of the upper organic layer, an appropriate amount of the lower water layer may be refluxed or else fresh water may be introduced into the column.

When a portion of upper organic layer is conducted from the dehydration zone to a second fractionation zone, it has been found advantageous to hold the alcohol-ether fraction concentration above a critical minimum value of, in the case of diacetone glycol dehydration, about 10% to 12% and yet not above about 50%. It has been found preferable to maintain about 20% ether-alcohol fraction. This portion of the upper organic layer is then fractionated in a second, smaller column to remove the light ends as an overhead distillate, and the bottom product is submitted to further fractionation in a third column maintaining a head temperature sufficient to permit removal of the diene as an overhead distillate. The bottom material from the third fractionation zone, consisting essentially of unsaturated alcohol intermediate and ether by-product, may then be treated in a fourth fractionation zone to remove the ether by any suitable means, such as by formation of an ether-rich azeotrope containing little or no alcohol, and to recover the unsaturated alcohol intermediate which is recycled to the dehydration zone.

When diacetone glycol is dehydrated, the $C_8$ ether may be separated from the $C_6$ unsaturated alcohol in this last column by addition of water in an amount sufficient to form the ether-rich, alcohol-water-ether ternary azeotrope which distils off at a temperature lower than that of the boiling point of $C_6$ unsaturated alcohol.

The hydrogen iodide or hydrogen chloride and corresponding unstable halides carried over may be removed in the same step wherein the diene is removed, by introducing dilute sodium carbonate or other non-volatile alkali solution to neutralize and/or hydrolyze the halide compounds before they can react with the unsaturated alcohol to dehydrate it to form diene which may then be lost by rejection with the ether-rich azeotrope. As in the preferred embodiment, care must be taken that none of the alkaline solution is carried over into the recycle stream to neutralize and destroy the catalyst in the dehydration zone.

When diacetone glycol is dehydrated according to the second embodiment of the invention, the fractionation column in direct communication with the dehydration zone is larger than the corresponding column in the first preferred embodiment, and it should contain more theoretical plates, preferably about 15 to 25. The second and third columns may be of approximately the same size as the second and third columns in the first preferred embodiment and contain about 5 to 15 theoretical plates (in some cases about 10 theoretical plates have been found convenient). The fourth fractionation column, which is smaller than the corresponding column in the first preferred embodiment, should contain about 20 to 30 theoretical plates. In the second embodiment, the column attached to the dehydration zone is larger and more efficient than the corresponding column in the first preferred embodiment; while the fourth column in the second embodiment is smaller but equal in efficiency to the corresponding column in the first preferred embodiment.

To more clearly understand how the second embodiment of the process of the invention may be applied to the production of polyolefinic hydrocarbons from polyhydric alcohols reference may be made to Figure II showing a preferred assemblage of apparatus adapted for use in the production of methylpentadiene from diacetone glycol by the procedure outlined above for the second embodiment of the invention. As in the case of Figure I, this drawing is intended only as an illustration and should not be considered as limiting the invention in any way.

The apparatus shown in Figure II consists of essentially the same parts as the apparatus in Figure I but differs from the previous assemblage of apparatus in the size and particular arrangement of the fractionating columns. In the second embodiment of the invention, for example, the first and fourth fractionating columns (colums J and M in Figure II) are the same size, slightly larger than the second and third columns and contain about 15 to 25 theoretical plates. The second and third columns (column K and L in Figure II) are the same size and contain about 10 to 15 theoretical plates. In Figure II the bottoms of second column are conducted to the third column while in Figure I the bottoms of second column are conducted to the fourth fractionating column. The particular reaction conditions to be maintained in the dehydration chamber and the specific kettle and stillhead temperatures to be used in the various fractionations are those described hereinabove for use in the production of the methylpentadienes from diacetone glycol by the second embodiment method of the invention.

In the operation of the apparatus shown in Figure 'I the diacetone glycol or the $C_6$ unsaturated alcohol obtained from a previous operation of the process is introduced into the dehydration chamber O through conduit 24. The products of the dehydration reaction are conducted to the first distillation column J through conduit 25. Water is introduced into the top of the column J through pipe 27. Unreacted diacetone glycol is returned to the dehydration chamber through conduit 26. The distillate from the first fractionation which consists essentially of methylpentadiene, light ends such as isobutylene, acetaldehyde, etc., $C_6$ unsaturated alcohol intermediate and $C_8$ ether by-products are taken through conduit 28 to a condenser 29 where the distillate is condensed to a liquid. The liquid is separated into an aqueous phase and an organic phase in accumulator 30. The aqueous phase and small part of organic phase is returned to column J through 31. The major portion of the organic phase is conducted to the second fractionating column through conduit 32. The light ends such as isobutylene, acetaldehyde, etc., are removed overhead in the second fractionating column K, conducted through conduit 33 to condenser 34 where the vapors are condensed and collected as liquid in accumulator 35. Part of the light end fraction is returned to the fractionating column through conduit 36. The bottoms of the second fractionation are conducted through conduit 37 to the third fractionating column L. Methylpentadiene is removed overhead in this third fractionation and conducted through conduit 38 to condenser 39 where it is condensed to a liquid and collected through pipe 40. Part of the methylpentadiene fraction is returned to the fractionating column through conduit 41. The bottoms of the third fractionation are conducted through conduit 42 to the fourth fractionating column M. Column M contains sodium bicarbonate or other alkali to assist in removal of any hydrogen iodide which might have been carried over from the original distillation in column J. The $C_8$ ether is removed overhead in the fourth fractionation in column M, conducted through conduit 43 to condenser 44 where the vapors are condensed to liquid and collected in accumulator 45. Part of the $C_8$ ether fraction is returned to column M through conduit 46. The bottoms of the fractionation in column M consists of the $C_6$ unsaturated alcohol intermediate which is recycled back to the initial dehydration reaction through conduit 47.

The following table compares the results obtained by the normal process heretofore used with the results obtained by the first preferred embodiment and the second embodiment of the process of this invention. The dehydration of diacetone glycol to methyl pentadiene serves as an example only, and is not intended as a limitation to the process of this invention. Vacuum distilled glycol was used, and the dehydration took place at a temperature of about 120° C. to about 145° C. and at about atmospheric pressure. The glycol feed contained about 0.05 weight per cent of iodine catalyst, and was added at the rate necessary to maintain a constant level in the dehydration zone.

|  |  | First Embodiment | Second Embodiment | Normal Process |
|---|---|---|---|---|
| I | Conditions in the fractionation zone directly connected to the dehydration zone: |  |  |  |
|  | (a) Reflux of water of dehydration | Yes | Yes | No |
|  | (b) Reflux of the organic layer of dehydration distillate | No | Yes | Yes |
| II | Continuous removal of ether by-product from the dehydration zone | Yes | Yes | No |
| III | Alcohol-ether fraction removed from the dehydration zone (as per cent of organic layer) | 55 | 19.1 | 2.5 |
| IV | Per Cent ether in ether-alcohol fraction | 7 | 50.4 | 36 |
| V | External recycle of unsaturated alcohol intermediate | Yes | 3 | No |
| VI | Length of operating cycle before reaction rate declined to impractical level (volumes of methyl pentadiene per volume of dehydration kettle charge) | ¹ 54 | ¹ 135 | 5 |
| VII | Average methyl pentadiene production rate (volumes per volume of dehydration kettle charge per hour) | 1.15 | 0.33 | 0.11 |
| VIII | Yield of products (mole per cent of glycol): |  |  |  |
|  | Acetaldehyde | 1.1 | 0.6 | 3.6 |
|  | Isobutylene | 3.1 | 4.1 | 5.3 |
|  | Methyl pentadiene | 83.9 | ³ 77.4 | 74.4 |
|  | $C_6$ unsaturated alcohol | 4.1 | ³ 7.8 | ³ 7.2 |
|  | $C_8$ ether by-product | 10.9 | 12.5 | 10.4 |
|  | Heavy ends (calculated as $C_6H_{10}$) | 1.4 | 1.3 | 9.0 |

¹ The dehydration rate was still rapid when the experiment was terminated.
² This alcohol was found largely in the dehydration zone at the conclusion of the experiment. Because of the short operating cycle it appears as an appreciable component of the products.
³ Actually, in this run the external recycle of unsaturated alcohol to the dehydration zone was not used. It is estimated that the use of such a recycle would have increased the methyl pentadiene yield from 77.4% to about 80.5% and decreased the unsaturated alcohol yield from 7.8% to about 4.7%, with no noticeable effect on the production rate or length of operating cycle.

We claim as our invention:

1. In a process for the production of a methyl pentadiene by condensing acetone to diacetone alcohol, catalytically hydrogenating the diacetone alcohol to diacetone glycol, and catalytically dehydrating the diacetone glycol to a methyl pentadiene, the improvement which comprises effecting the dehydration of the diacetone glycol by heating it in the liquid phase and in the presence of iodine under dehydration conditions in a dehydration zone in direct communication with a fractionation zone, continuously adding water to the top of the fractionation zone while distilling therefrom an overhead distillate comprising the methyl pentadiene, unsaturated alcohol intermediate, ether by-products, light ends and water, conducting said overhead distillate to a second fractionation zone wherein it is fractionated and the methyl pentadiene and light ends are removed as an overhead distillate, conducting the overhead distillate from the second fractionation zone to a third fractionation zone where it is distilled to separate methyl pentadiene from light ends, conducting the bottoms comprising unsaturated alcohol intermediate, ether by-products and water from the second fractionation zone to a fourth fractionation zone wherein they are distilled to separate water and a ternary azeotrope comprising 2,4,6 - trimethyl - 5,6 - dihydro-1,2-pyran, 2-methyl-2-pentene-4-ol and water from the excess unsaturated alcohol intermediate, and recycling the unsaturated alcohol intermediate to the dehydration zone.

2. A process for the dehydration of diacetone glycol which comprises effecting the dehydration of diacetone glycol by heating it in the liquid phase and in the presence of iodine under dehydration conditions in a dehydration zone in direct communication with a fractionation zone, continuously introducing water to the top of said fractionation zone while distilling therefrom an overhead distillate comprising methyl pentandiene, unsaturated alcohol intermediate, ether by-product, light ends and water, conducting said overhead distillate to a second fractionation zone wherein it is fractionated and methyl pentadiene and light ends are removed as an overhead distillate, conducting the overhead distillate from the second fractionation zone to a third fractionation zone wherein it is distilled to separate methyl pentadiene from the light ends, conducting the bottoms comprising unsaturated alcohol intermediate, ether by-product and water from the second fractionation zone to a fourth fractionation zone wherein they are distilled to separate a ternary azeotrope comprising 2,4,6-trimethyl - 5,6-dihydro-1,2-pyran, 2-methyl-2-pentene-4-ol and water as an overhead distillate from the excess unsaturated alcohol intermediate, and recycling the unsaturated alcohol intermediate to the dehydration zone.

3. A process for the dehydration of diacetone glycol which comprises heating the diacetone glycol in the liquid phase and in the presence of a dehydration catalyst under dehydration conditions in a dehydration zone in direct communication with a fractionation zone, continuously adding water to the top of the fractionation zone while distilling therefrom an overhead distillate comprising methyl pentadiene, unsaturated alcohol intermediate, ether by-products, light ends and water, conducting said overhead distillate to a second fractionation zone wherein it is fractionated to remove methyl pentadiene and light ends as an overhead distillate, conducting the overhead distillate from the second fractionation zone to a third fractionation zone wherein it is distilled to separate methyl pentadiene from the light ends, conducting the bottoms from the second fractionation zone comprising unsaturated alcohol intermediate, ether by-product and water to a fourth fractionation zone wherein they are distilled to separate water and a ternary azeotrope comprising 2,4,6-trimethyl-5,6-dihydro-1,2-pyran, 2-methyl-2-pentene-4-ol and water as an overhead distillate from the excess unsaturated alcohol intermediate, and recycling the unsaturated alcohol intermediate to the dehydration zone.

4. In a process for the production of a methyl pentadiene by condensing acetone to diacetone glycol, catalytically hydrogenating the diacetone alcohol to diacetone glycol and catalytically dehydrating the diacetone glycol to a methyl pentadiene, the improvement which comprises effecting the dehydration of the diacetone glycol by heating it in the liquid phase and in the presence of iodine under dehydration conditions in a dehydration zone in direct communication with a fractionation zone, continuously adding water to the top of the fractionation zone while distilling therefrom an overhead distillate comprising methyl pentadiene, unsaturated alcohol intermediate, ether by-products, light ends and water, cooling the overhead distillate to form two phases comprising an upper organic layer and a lower aqueous layer, drawing off the bottom aqueous layer, returning a portion of the upper organic layer as reflux to the dehydration zone, conducting the remainder of the top organic layer comprising methyl pentadiene, unsaturated alcohol intermediate, ether by-products and light ends to a second fractionation zone wherein it is fractionated to remove light ends as an overhead distillate, conducting the bottoms comprising methyl pentadiene, unsaturated alcohol intermediate and ether by-products from the second fractionation zone to a third fractionation zone wherein they are distilled to remove methyl pentadiene as an overhead distillate, conducting the bottoms from the third fractionation zone comprising unsaturated alcohol intermediate and ether by-products to a fourth fractionation zone, continuously adding water to the fourth fractionation zone while distilling therefrom a ternary azeotrope comprising 2,4,6-trimethyl-5,6-dihydro-1,2-pyran, 2-methyl-2-pentene-4-ol and water to separate said azeotrope from the excess unsaturated alcohol intermediate, and recycling the unsaturated alcohol intermediate to the dehydration zone.

5. A process for the production of a methyl pentadiene by catalytically dehydrating diacetone glycol which comprises effecting the dehydration of diacetone glycol by heating it in the liquid phase and in the presence of a dehydration catalyst under dehydration conditions in a dehydration zone in direct communication with a fractionation zone, rapidly removing ether by-products from the fractionation zone by distilling therefrom an overhead distillate comprising methyl pentadiene, unsaturated alcohol intermediate, ether by-products, light ends and water, treating the overhead distillate to remove separately methyl pentadiene, light ends, water and ether by-products from the unsaturated alcohol intermediate, and recycling the unsaturated alcohol intermediate to the dehydration zone.

6. In a process for the production of methyl pentadiene by condensing acetone to diacetone alcohol, catalytically hydrogenating the diacetone alcohol to diacetone glycol, and catalytically dehydrating the diacetone glycol to methyl pentadiene, the improvement which comprises effecting the dehydration of diacetone glycol by heating it in the liquid phase and in the presence of a dehydration catalyst under dehydration conditions in a dehydration zone in direct communication with a fractionation zone, continuously adding water to the top of the fractionation zone while distilling therefrom an overhead distillate comprising methyl pentadiene, unsaturated alcohol intermediate, ether by-products, light ends and water, treating the overhead distillate to remove separately methyl pentadiene, light ends, water and ether by-products from the unsaturated alcohol intermediate, and recycling the unsaturated alcohol intermediate to the dehydration zone.

WILLIAM T. SCHELLING.
JOHN ANDERSON.

REFERENCES CITED

The following references are of record in the file of this patent:

UNITED STATES PATENTS

| Number | Name | Date |
|---|---|---|
| 2,242,575 | Eisleb | May 20, 1941 |
| 2,184,164 | Mueller-Cunradi et al. | Dec. 19, 1939 |
| 2,315,995 | Williams | Apr. 6, 1943 |
| 2,371,530 | Lorch | Mar. 13, 1945 |
| 2,174,280 | Wellman | Sept. 26, 1939 |

(Other references on following page)

UNITED STATES PATENTS

| Number | Name | Date |
|---|---|---|
| 1,844,899 | Miller | Feb. 9, 1932 |
| 2,381,506 | Loane | Aug. 7, 1945 |

FOREIGN PATENTS

| Number | Country | Date |
|---|---|---|
| 137,387 | Switzerland | Mar. 1, 1930 |

OTHER REFERENCES

Kyriakides, Jour. Am. Chem. Soc., vol. 36, 993–5, 998 (1914). (Pat. Office Library.)

Duveen et al., Jour. Chem. Soc., pages 1451-3 (1936). (Pat. Off. Lib.)

Dupont et al., Bull. Soc. Chim. (5), vol. 6, 1208–1214 (1939). (Pat Office Library.)